United States Patent
Sarma et al.

(10) Patent No.: US 6,432,163 B1
(45) Date of Patent: Aug. 13, 2002

(54) METAL REFINING METHOD USING DIFFERING REFINING OXYGEN SEQUENCE

(75) Inventors: Balu Sarma, Bangalore (IN); Ronald Joseph Selines, North Salem, NY (US); John Erling Anderson, Somers, NY (US); William John Mahoney, Stony Point, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/886,279

(22) Filed: Jun. 22, 2001

(51) Int. Cl.⁷ .................................................. C21C 5/32
(52) U.S. Cl. ............................ 75/414; 75/552; 75/553; 75/554; 75/555; 75/708
(58) Field of Search ........................ 75/414, 708, 552, 75/553, 555, 554

(56) References Cited

U.S. PATENT DOCUMENTS

| | | | |
|---|---|---|---|
| 3,427,151 A | 2/1969 | Koudelka et al. | 75/59 |
| 4,622,007 A | 11/1986 | Gitman | 432/13 |
| 5,100,313 A | 3/1992 | Anderson et al. | 431/8 |
| 5,714,113 A | 2/1998 | Gitman et al. | 266/182 |
| 5,814,125 A | 9/1998 | Anderson et al. | 75/414 |
| 5,823,762 A | 10/1998 | Anderson et al. | 431/8 |
| 6,096,261 A | 8/2000 | Anderson et al. | 266/225 |
| 6,125,133 A | 9/2000 | Mathur et al. | 373/8 |
| 6,139,310 A | 10/2000 | Mahoney et al. | 431/8 |
| 6,142,764 A | * 11/2000 | Anderson et al. | 431/81 |
| 6,171,544 B1 | 1/2001 | Anderson et al. | 266/47 |
| 6,176,894 B1 | 1/2001 | Anderson et al. | 75/414 |
| 6,241,510 B1 | 6/2001 | Anderson et al. | 431/8 |

OTHER PUBLICATIONS

Flinn et al., "Jet Penetration and Bath Circulation in the Basic Oxygen Furnace", Transactions of the Metallurgical Society of AIME, pp 1777–1791, vol. 239 (1967) no month.
Koncsics et al., "Praxair Coherent Jet Technology: Current and Future Applications", pp 1–10 (1998) no month.
Sarma et al., "Fundamental Aspects of Coherent Gas Jets" (1998) no month.
Miller et al., "Oxygen Steelmaking Processes", The AISE Steel Foundation, pp 475–524 (1998) no month.

* cited by examiner

*Primary Examiner*—Melvyn Andrews
(74) *Attorney, Agent, or Firm*—Stanley Ktorides

(57) ABSTRACT

A metal refining method particularly useful with a basic oxygen steelmaking process, wherein during an initial period, refining oxygen is provided into the furnace headspace surrounded by a shroud comprising oxygen and inert gas, and during a subsequent period refining oxygen is provided into the furnace headspace surrounded by a flame shroud.

10 Claims, 3 Drawing Sheets

US 6,432,163 B1

METAL REFINING METHOD USING DIFFERING REFINING OXYGEN SEQUENCE

TECHNICAL FIELD

This invention relates generally to metal refining wherein oxygen is provided to the molten metal from above the surface of the molten metal, and is particularly useful for use with steel refining processes such as the basic oxygen process.

BACKGROUND ART

In refining of metals, such as the production of steel using the basic oxygen process (BOP), oxygen is provided into the molten metal bath to react with constituents of the molten metal some of which are incorporated into a molten slag which along with the molten metal comprise the molten bath. These reactions serve to provide heat to the molten metal to help maintain the metal in a molten condition, and also serve to remove unwanted constituents to arrive at the melt chemistry desired for the final product.

The oxygen may be provided to the molten bath from above the molten bath surface, such as in BOP practice, or may be provided to the molten bath from below the molten bath surface, such as in the quick basic oxygen process (Q-BOP) practice and the argon oxygen decarburization (AOD) practice.

The provision of oxygen to the molten bath from above the molten bath surface is less complicated and less expensive than the provision of oxygen to the molten bath from below the molten bath surface because the latter procedure increases refractory wear, requires frequent replacement of the submerged injection devices, e.g. tuyeres, due to the harsh environment created by the submerged oxygen injection and requires the use of an inert or hydrocarbon shroud gas to protect the tuyeres. The high cost is due to the higher refractory consumption, the cost of the shroud gases and replacement tuyeres, and the downtime incurred by the requisite tuyere replacement.

However, top injection of oxygen in metal refining is less effective than bottom injection because less mixing of the molten metal bath occurs with top injection practices. This results generally in lower yields for top blown metal refining processes compared to comparable bottom blown processes. For example, the iron and manganese yield for top oxygen blown converter processes such as the BOP is lower than that for bottom oxygen blown converter processes such as the Q-BOP due to insufficient gas stirring energy for adequate mixing of the metal and slag. In addition, the consumption of aluminum for steel deoxidation is higher for the BOP compared to the Q-BOP due to a higher dissolved oxygen content at the end of the refining process.

One way of addressing this problem is to inject the oxygen from both above and below the molten metal surface. This reduces somewhat the costs associated with oxygen injection from below the molten metal surface and the frequency of tuyere replacement but at the cost of requiring the operation of two separate oxygen provision systems. Another way of addressing this problem is to inject the oxygen into the furnace headspace from only a short distance above the molten metal surface to provide additional mixing of the metal and slag, at least for a portion of the oxygen injection period. However, this practice is still unsatisfactory because of increased wear of the oxygen injection lance.

Inasmuch as the BOP is used to produce about 60 percent of world steel production, any improvement in top oxygen injection processes such as the BOP would be highly desirable.

Accordingly, it is an object of this invention to provide an improved method for refining metal which employs the provision of oxygen to the molten metal from above the molten metal surface and which can provide effective gas stirring energy to the molten metal bath without compromising the integrity of the oxygen injection lance.

SUMMARY OF THE INVENTION

The above and other objects, which will become apparent to those skilled in the art upon a reading of this disclosure, are attained by the present invention which is:

A method for refining metal comprising contacting a molten metal bath containing silicon and carbon for a time sufficient to refine and decarburize said molten metal to a target metal purity with an oxygen-containing gas stream wherein said gas stream contains at least about 80 mole percent oxygen and is provided from a nozzle having an exit diameter d, and wherein said contacting occurs in first and second phases, said first phase constituting the initial about 10 to 90 percent of the total contacting period and being characterized by the gas stream being such as to have a supersonic jet length of less than 30d, having a broad contact area with the molten metal, and being surrounded by a gas shroud comprising a secondary oxygen-containing gas and an inert gas, said first phase conducted until at least 50 percent of the silicon in the molten metal bath has been oxidized; and said second phase constituting substantially the balance of said total contacting period and being characterized by the gas stream being such as to have a supersonic jet length of greater than about 30d, having a smaller contact area with the molten metal, and being surrounded by a flame shroud, said second phase conducted until the molten metal has been decarburized to substantially achieve a target residual carbon level.

As used herein the term "headspace" means the space which is located above the quiescent molten bath surface and below the plane defined by the top opening of the metal refining furnace.

As used herein the term "coherent jet" means a gas stream which has a substantially constant diameter along its length.

As used herein the term "decarburize" means to remove carbon from molten metal by reacting carbon with oxygen to form carbon monoxide or carbon dioxide.

As used herein the term "supersonic jet length" means the length of a jet from a nozzle wherein its axial velocity is supersonic as measured under ambient atmospheric conditions.

As used herein the term "axial velocity" means the velocity of a gas stream at its axial centerline.

As used herein "jet force" means the calculated penetrating force of the jet which is proportional to the product of the gas density and the square of the gas velocity integrated within the area of the gas stream defined by the original nozzle area which is equal to $\pi d^2/4$.

As used herein "ambient atmospheric conditions" means ambient air with a temperature in the range of zero(0) to one hundred (100) degrees Fahrenheit. For purposes of this invention the gas jets 23 and 30 useful herein are those which satisfy the criteria for axial velocity and jet force retention at a jet length of 30d set forth herein when tested under ambient atmospheric conditions under model test conditions. Gas jets having an axial velocity of less than Mach 1 and a jet force of less than 20% of the original jet force at a jet length of 30d are referred to herein as having a "broad contact area with the molten metal". Gas jets having an axial velocity of greater than Mach 1 and a jet force of greater than 50% of the original jet force at a jet length of 30d are referred to herein as having a "smaller contact area with the molten metal".

As used herein "model test conditions" are as follows. The jets are characterized in an open-air test facility. The jets are formed and injected into the ambient air, where the structure of the jet is probed using a pitot-tube. The pitot-tube measures the dynamic pressure of the flowing gas from which various jet properties can be determined. This probe is capable of moving in three-dimensions, allowing full spatial characterization. Typically, only one of the jets is probed. The un-probed jets are assumed to be identical to the probed jet. The measurements taken are 1) the axial dynamic pressure profile (centerline) and 2) the radial dynamic pressure profile (taken at various axial positions). The Mach number, velocity and force profiles are calculated from the pitot-tube measurements using well-known gas dynamic relationships.

Figure 1:
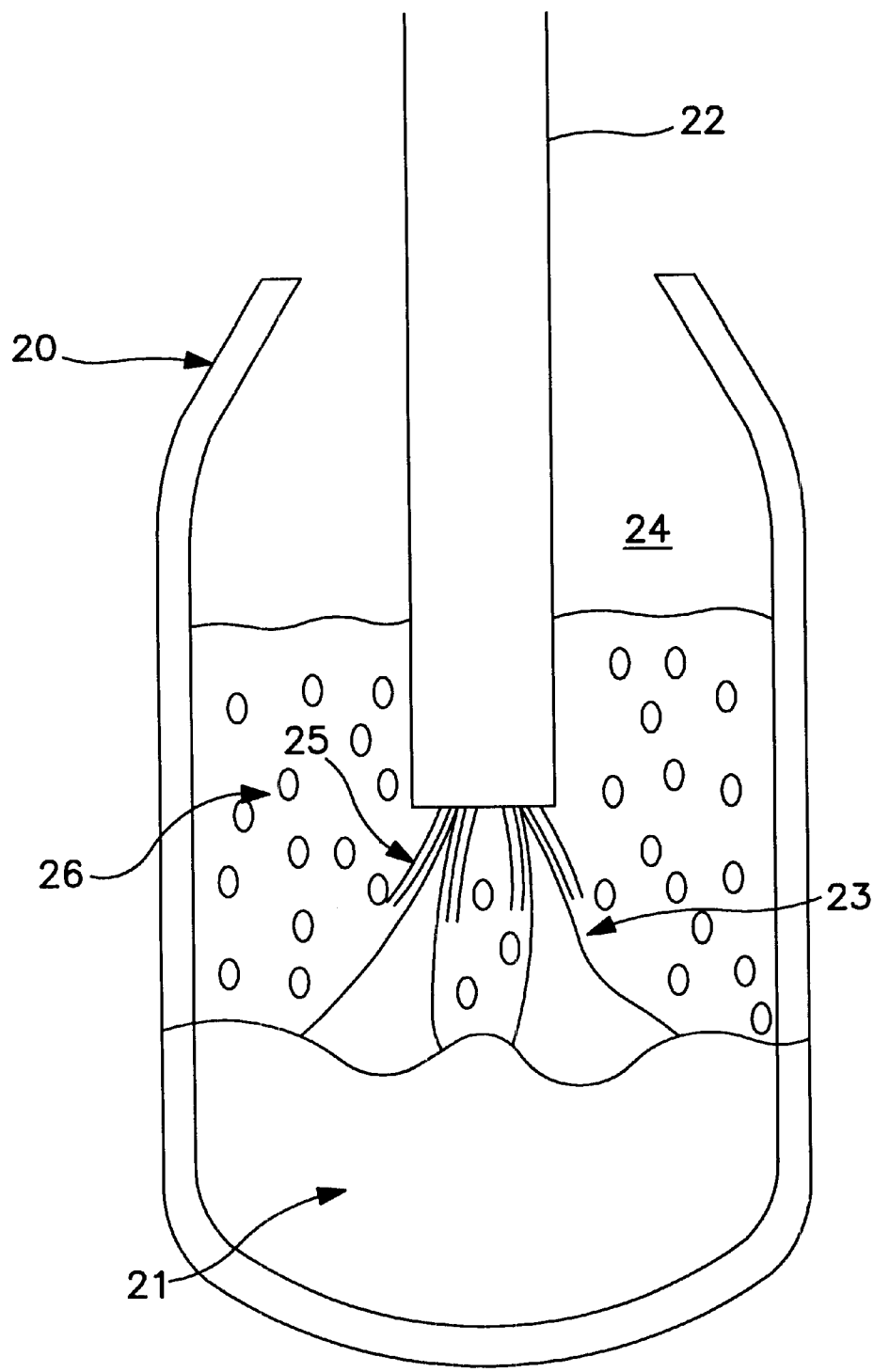
FIG. 1 is a representative illustration showing the first phase or soft blow period of the metal refining method of this invention.

The numerals in the Drawings are the same for the common elements.

DETAILED DESCRIPTION

The invention will be described in detail with reference to the Drawings and with reference to its use in a BOP.

FIG. 1 illustrates a basic oxygen furnace 20 wherein a charge 21 is refined to produce steel. The charge typically comprises molten iron, such as hot metal from a blast furnace, steel scrap, and slag forming agents such as lime, dolomitic lime, or fluorspar. The charge typically has a silicon concentration of from about 0.05 to 2.0 weight percent and a carbon concentration of from about 4 to 4.5 weight percent.

During the first phase or soft blowing period of the total oxygen blowing period, refining oxygen is injected from oxygen lance 22 in one or more gas streams 23 into the headspace 24 of furnace 20. In the embodiment illustrated in FIG. 1 a plurality of gas streams 23 are employed. In this first phase of the total oxygen blowing period, an oxygen-containing gas stream containing at least about 80% oxygen, and preferably comprising pure oxygen, is ejected in the form of oxygen jets 23 which provide a broad contact area with the surface of the molten metal bath. As will be described more fully hereinafter, in this first phase of the oxygen refining process, a relatively broad contact area with the surface of the molten metal bath and any unmelted scrap is desired in order to promote the formation of FeO and SiO2 which lower the melting point of the slag and to release the heat associated with these reactions to facilitate rapid melting and formation of the molten slag portion of the molten bath. Reaction of some of the injected oxygen gas with CO in the head space of the vessel provides yet additional heat for rapid molten slag formation and for additional scrap melting. The gas jets 23 exit through Laval nozzles which have a converging section, a throat section, and a diverging exit section with an exit diameter d, and have an exit velocity in excess of Mach 1, and typically in the range of Mach 1.5 to Mach 2.5. In order to increase entrainment of the surrounding atmosphere in the oxygen jets 23 and thereby broaden the contact area of these jets the gas jets 23 are surrounded by a gas shroud 25 which comprises a secondary oxygen-containing gas and at least one inert gas. The preferred inert gas is nitrogen. Other inert gases which may be used in the practice of this invention include argon, carbon dioxide, and helium. The flow rate of the secondary oxygen-containing gas and the inert gas are each typically in the range of from two (2) to ten (10) percent of the total flow of all gas jets 23. The oxygen jets 23 interact with the surrounding atmosphere to create a region of turbulent mixing that entrains the surrounding atmosphere and causes the oxygen jets 23 to lose jet velocity and force such that at a distance of 30d from the nozzle exit under ambient atmospheric conditions, the axial velocity of gas jets 23 is less than Mach 1 and the jet force is less than 20 percent, and preferably less than 10 percent of the original jet force at the nozzle exit. This loss of jet force is a measure of the degree to which the gas jets 23 have spread to become less penetrating and to provide a larger area of surface contact and chemical reaction with the surrounding atmosphere, with unmelted scrap, and with the surface of the molten bath.

The oxygen gas streams 23 have a supersonic velocity upon their injection into the headspace 24 from lance 22 but, owing to the inert gas in the gas shroud which shields the refining oxygen gas stream(s) from the atmosphere within the furnace headspace, the velocity of gas streams 23 decays rapidly to become subsonic significantly before streams 23 reach the surface of the metal charge 21. The supersonic jet length of each of gas streams 23 is less than 30d. As the velocity of the gas streams 23 falls below sonic velocity each of the gas streams 23 spread out with a half angle of about 10 degrees increasing their diameter and resulting in a soft, i.e. less penetrating, stream and a large area of surface contact with the surrounding atmosphere and with the surface of the molten bath. Since the headspace contains oxidizeable species such as carbon monoxide, if the inert gas flow were not present proximate the refining oxygen stream (s), the refining oxygen streams would be subjected to a confining combustion reaction which would inhibit spreading.

During or prior to this first phase or soft blow period of the oxygen blowing period fluxes such as lime and dolomite are added to the charge to achieve the desired slag chemistry and to neutralize silicon dioxide which is formed. The soft blow oxygen streams contact a greater portion of the charge surface to more quickly and uniformly react with carbon, silicon and other metallic components in the charge to melt the fluxes and to form a molten slag 26, within the headspace above the molten metal surface, having the desired chemistry to protect the furnace lining and to facilitate the removal of impurities such as phosphorous and sulfur. In addition, the soft blow oxygen streams are less likely to be reflected by unmelted scrap that may be present at the beginning of the oxygen blowing period which could cause damage to the lance or the furnace lining. Furthermore, the expanding nature of the soft blow oxygen streams serves to entrain a significant amount of the headspace atmosphere in the streams 23. The headspace atmosphere contains a high percentage of carbon monoxide and a portion of the entrained carbon monoxide is combusted with the oxygen in the gas streams 23 to form carbon dioxide. The resultant heat that is released by this combustion increases the amount of scrap that can be melted which lowers cost and increases productivity. The additional oxygen contained in gas shroud 25 also reacts with carbon monoxide further increasing the amount of heat generated during this initial or soft blow period. The first phase or soft blow period continues until at least 50 percent, preferably at least 75 percent of the silicon in the molten metal is oxidized and converted to silicon dioxide.

The first phase or soft blow period of the oxygen blowing period is followed by a second phase or hard blow period. Generally the soft blow period will comprise the initial from 10 to 90 percent, preferably the initial from 20 to 80 percent of the sum total of the time of the initial soft blow period and the subsequent hard blow period. The transition period from soft blowing to hard blowing depends on the response time of the gas control system and is typically within the range of from 5 to 90 seconds.

Figure 2:
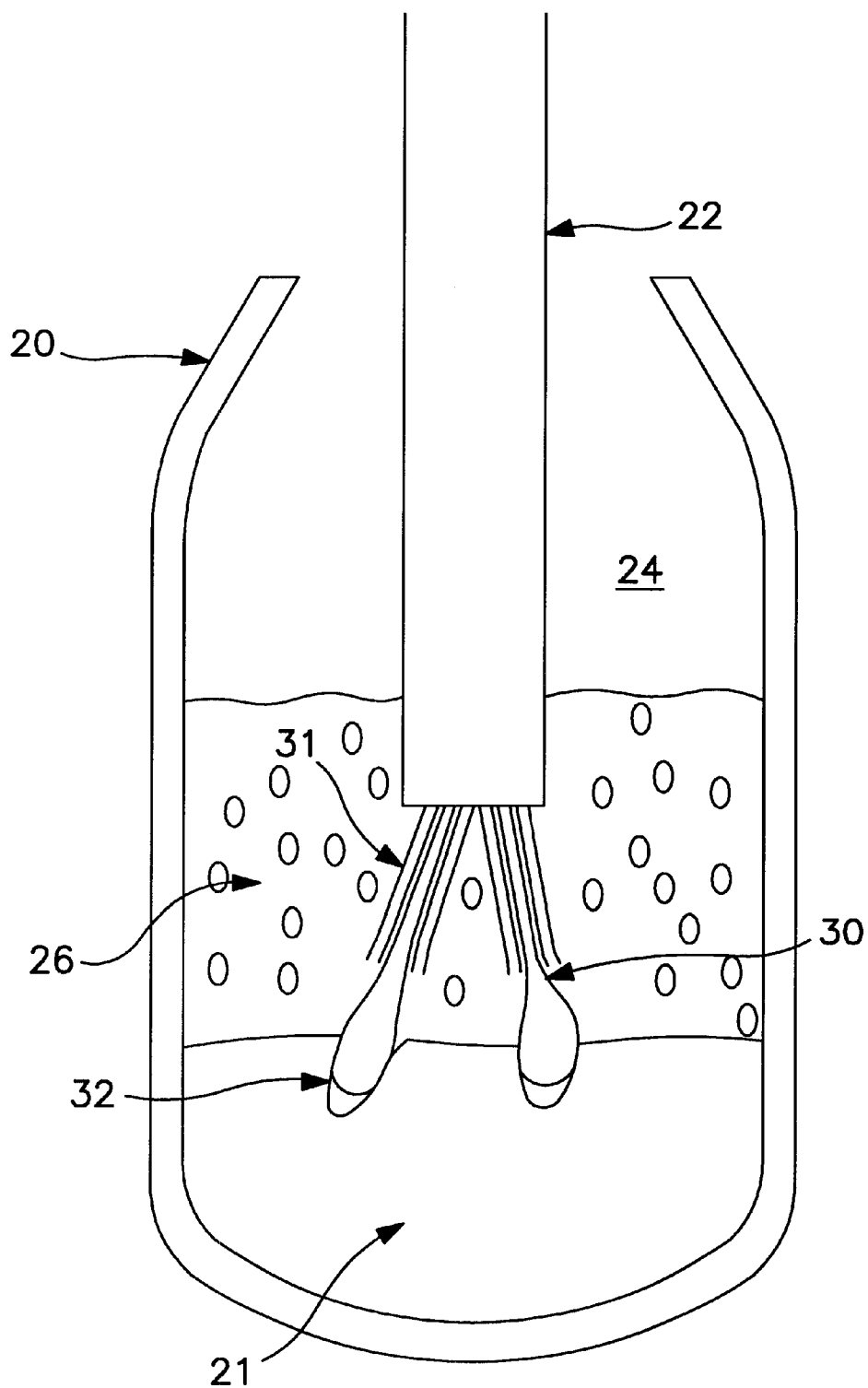
FIG. 2 is a representative illustration showing the second phase or hard blow period of the metal refining method of this invention.

FIG. 2 illustrates the operation of the method of this invention during the second phase or hard blow period. It is an important advantage of this invention that the lance 22 need not be brought as close to the surface of the molten bath during the hard blow period as it would be in conventional BOF practice while still getting high mixing energy benefits.

Referring now to FIG. 2, during the second phase or hard blow period refining oxygen is injected in one or more gas streams 30 from lance 22 into headspace 24. In the embodiment illustrated in FIG. 2, a plurality of gas jets 30 are employed. The gas jets 30 exit through Laval nozzles which have a converging section, a throat section and a diverging exit section, and have an exit velocity in excess of Mach 1, and typically in the range of Mach 1.5 to Mach 2.5. Unlike the first phase where oxygen and inert gas was provided in a shroud around the gas jets, during the second phase, oxygen and a combustible fluid are provided around the gas jets 30. This oxygen and combustible fluid combust to form a flame shroud 31 around the gas jets 30. The flow rate of the oxygen and the combustible gas are selected to produce a flame shroud that minimizes entrainment of the surrounding atmosphere in the gas jets 30 and maximizes the retention by these jets of their axial velocity, momentum and mixing energy. Typically, each of these gas flows will be in the range of from two (2) to ten (10) percent of the total flow of all gas jets 30. Flame shroud 31 serves to form a barrier between gas jets 30 and the atmosphere of headspace 24 thus keeping the headspace atmosphere from being entrained into gas jets 30. As a consequence, the axial velocity of gas jets 30 at a distance of 30d from the nozzle exit, when tested under ambient atmospheric conditions is characterized by an axial velocity greater than Mach 1 and is, in the preferred embodiment, substantially equal to the design exit velocity of gas jets 30, and the jet force is greater than 50 percent, and preferably greater than 70 percent of the original jet force at the nozzle exit. This greater retention of jet axial velocity and jet force during the second phase is a measure of the degree to which the gas jets 30 retain their ability to impact the bath surface with a very high momentum over a relatively smaller area, thus delivering more mixing energy to the molten bath. This greater mixing energy of the gas jets 30 improves decarburization of the molten metal bath and thereby the efficiency of the refining process.

Each gas jet 30 is injected into the headspace from a nozzle, typically a converging/diverging nozzle, having an exit diameter (d). Each gas jet 30 will have supersonic jet length of at least 30d, and up to 50d or more. Moreover, each gas jet 30 will be coherent and remain coherent for at least a portion of the distance within the headspace from injection from lance 22 to the surface of charge 21. Generally each gas jet 30 will be coherent and remain coherent for a distance of at least 30d, and up to 50d or more, from its injection into the headspace from its injection nozzle on lance 22. Gas jet(s) 30 may have a supersonic jet length and be coherent for substantially the entire distance within the headspace from the lance to the surface of the molten bath.

The supersonic axial velocity and the coherent nature of the oxygen jet(s) during the hard blowing period enable the oxygen jet(s) to impact the molten metal surface with very high momentum over a relatively small area, smaller than the contact area during the first phase, thus maximizing and concentrating the available mixing energy delivered to the molten metal by the gas jet(s). This is shown in FIG. 2 by the deep penetration 32 of the oxygen jets into the molten metal. This results in improved slag metal mixing with lower iron oxide in the slag and/or dissolved oxygen in the refined metal, higher yield, less splashing and spitting, higher productivity and lower carbon content of the refined metal. The second phase of the total refining or oxygen contacting period continues until the molten metal bath has been decarburized to substantially achieve a target carbon level, typically from about 0.03 to 0.15 weight percent.

At the conclusion of the second phase or hard blowing period the lance is withdrawn from the furnace and the refining oxygen jet(s) and the oxidant and combustible fluid for the flame shroud are turned off. The furnace is then tilted in order to pour the refined steel into a ladle. Alloys and deoxidants such as aluminum and silicon are added to obtain the desired final steel chemistry and to remove unwanted oxygen that is dissolved in the steel.

Figure 3:
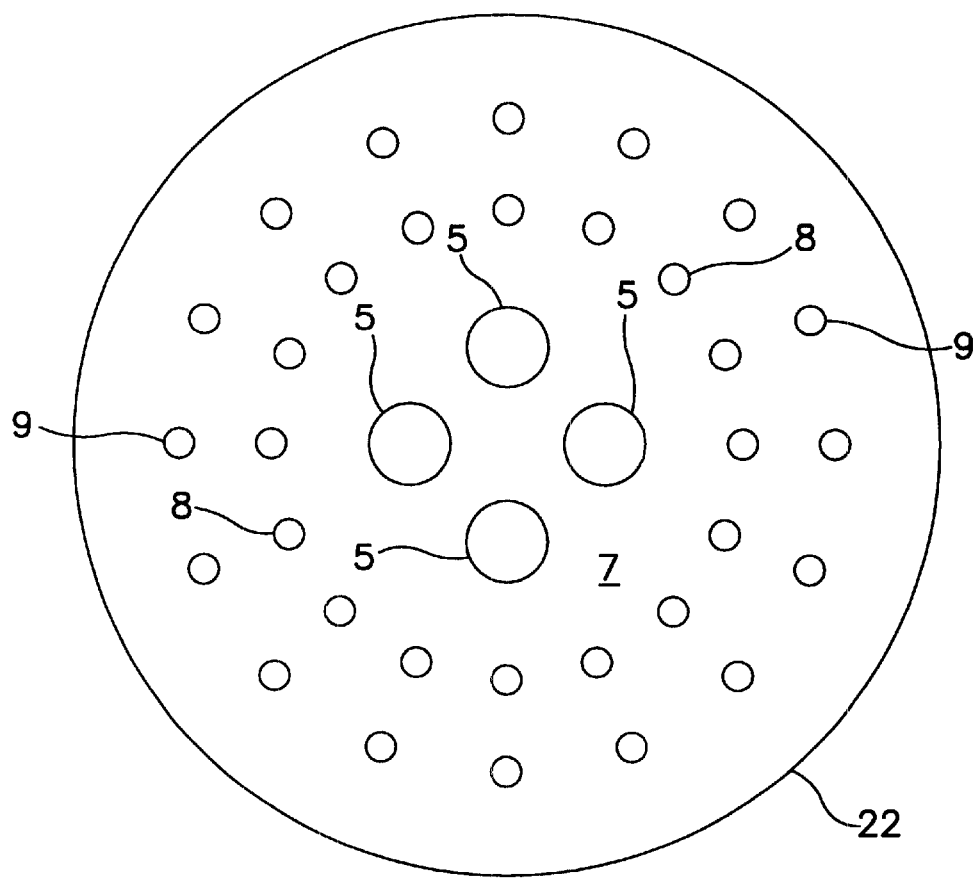
FIG. 3 is a head on view of one preferred embodiment of a lance useful for the practice of this invention.

FIG. 3 illustrates one preferred arrangement of a lance head which may be used to carry out the method of this invention. Referring now to FIG. 3 there are shown four oxygen nozzles 5 on the face 7 of lance 22. In the practice of this invention preferably from 1 to 6, most preferably from 3 to 5, oxygen nozzles are used with each oxygen nozzle providing a soft blow gas stream and thereafter a hard blow supersonic coherent gas jet. Oxygen nozzles 5 are preferably oriented at an outward angle to the centerline of the lance which may be in the range of from about 6 to 20 degrees. As shown in FIG. 3, oxygen nozzles 5 are preferably arranged in a circle on the face 7 of lance 22. Streams of oxygen are ejected out of nozzles 5 during both the initial soft blow and the subsequent hard blow periods of the method of the invention.

Also on the face 7 of lance 22 is an inner ring of holes 8 and an outer ring of holes 9. Preferably, as shown in FIG. 3, the outer holes 9 are aligned with the inner holes on respective radii on the lance face. Each of the inner ring of holes and the outer ring of holes is in a circular arrangement around the oxygen nozzle(s). During the initial soft blow period oxygen is passed out of the outer ring of holes 9 and inert gas, such as nitrogen, is passed out of the inner ring of holes 8 to form the gas shroud which surrounds the soft blow gas stream(s) and enables the soft blow gas stream(s) to expand. The oxygen passed out through outer ring of holes 9 is a fluid comprising at least 80 mole percent oxygen. At the conclusion of the soft blow period the inert gas flow through holes 8 is halted and replaced by the flow of combustible fluid, i.e. fuel. The preferred fuel is methane or natural gas. Other fuels which may be used in the practice of this invention include propane, butane, butylene, hydrogen, coke oven gas and oil. The fuel mixes with and combusts with the oxygen provided through outer holes 9 to form the flame shroud which surrounds the hard blow oxygen jet(s) and serves to keep them coherent and at a supersonic velocity for at least a portion of the distance as they pass from the lance to the molten metal surface.

Although the invention has been described in detail with reference to a certain preferred embodiment in conjunction with BOP practice, those skilled in the art will recognize that there are other embodiments of the invention within the spirit and the scope of the claims. For example, the invention may be practiced with subsurface injection processes such as the Q-BOP and AOD processes. Also, a provision means comprising a single ring of holes around the refining oxygen nozzle(s) could be used wherein the inert gas or combustible fluid and the oxygen pass through alternating holes of this provision means. Also, instead of rings of holes 8 and 9 as shown in FIG. 3, other provision means such as annular or ring-shaped openings around the refining oxygen nozzle(s) could be used.

What is claimed is:

1. A method for refining metal comprising contacting a molten metal bath containing silicon and carbon for a time sufficient to refine and decarburize said molten metal to a target metal purity with an oxygen-containing gas stream wherein said gas stream contains at least about 80 mole percent oxygen and is provided from a nozzle having an exit diameter d, and wherein said contacting occurs in first and second phases, said first phase constituting the initial about 10 to 90 percent of the total contacting period and being characterized by the gas stream being such as to have a supersonic jet length of less than 30d, having a broad contact area with the molten metal, and being surrounded by a gas shroud comprising a secondary oxygen-containing gas and an inert gas, said first phase conducted until at least 50 percent of the silicon in the molten metal bath has been oxidized; and said second phase constituting substantially the balance of said total contacting period and being characterized by the gas stream being such as to have a supersonic jet length of greater than about 30d, having a smaller contact area with the molten metal, and being surrounded by a flame shroud, said second phase conducted until the molten metal has been decarburized to substantially achieve a target residual carbon level.

2. The method of claim 1 wherein the metal comprises iron.

3. The method of claim 1 wherein the inert gas comprises nitrogen.

4. The method of claim 1 wherein during the first phase the gas stream has a jet force at a distance of 30d from the nozzle which is less than 20 percent of its initial jet force when provided from the nozzle, and during the second phase the gas stream has a jet force at a distance of 30d from the nozzle which is greater than 50 percent of its initial jet force when provided from the nozzle.

5. The method of claim 1 wherein the gas shroud is formed by providing a flow of inert gas annularly to the gas stream, and a flow of secondary oxygen-containing gas annularly to the flow of inert gas.

6. The method of claim 1 wherein the flame shroud is formed by providing a flow of combustible fluid annularly to the injected gas streams, and a flow of secondary oxygen-containing gas annularly to the flow of combustible fluid.

7. The method of claim 1 wherein during the first phase the gas stream is provided from at least one nozzle on a lance and a flow of inert gas for the gas shroud is provided annularly to the gas stream from a plurality of holes on the lance, and during the second phase a flow of combustible fluid for the flame shroud is provided from said plurality of holes.

8. The method of claim 7 wherein a flow of secondary oxygen-containing gas for the gas shroud is provided annularly to the flow of inert gas from a second plurality of holes on the lance.

9. The method of claim 1 wherein during the first phase the gas stream is provided from at least one nozzle on a lance and a flow of inert gas and a flow of secondary oxygen-containing gas for the gas shroud is provided annularly to the gas stream from a plurality of holes on the lance in alternating sequence, and during the second phase a flow of combustible fluid for the flame shroud is provided from the holes from which inert gas was provided during the first phase.

10. The method of claim 1 employing a plurality of oxygen-containing gas streams surrounded by the gas shroud during the first phase and surrounded by the flame shroud during the second phase.

\* \* \* \* \*